US008848409B2

(12) United States Patent
Dujic et al.

(10) Patent No.: US 8,848,409 B2
(45) Date of Patent: Sep. 30, 2014

(54) MULTILEVEL CONVERTER AND A CONTROL METHOD FOR OPERATING A MULTILEVEL CONVERTER

(75) Inventors: Drazen Dujic, Wettingen (CH); Francisco Canales, Baden-Dättwil (CH); Akos Mester, Nussbaumen (CH)

(73) Assignee: ABB Technology AG, Zurich (CH)

( * ) Notice: Subject to any disclaimer, the term of this patent is extended or adjusted under 35 U.S.C. 154(b) by 70 days.

(21) Appl. No.: 13/606,924

(22) Filed: Sep. 7, 2012

(65) Prior Publication Data

US 2013/0063981 A1 Mar. 14, 2013

(30) Foreign Application Priority Data

Sep. 8, 2011 (EP) .................................... 11180537

(51) Int. Cl.
*H02M 7/155* (2006.01)
*H02M 7/219* (2006.01)
*H02M 3/335* (2006.01)
*H02M 1/42* (2007.01)
*H02M 7/162* (2006.01)
*H02M 1/00* (2006.01)

(52) U.S. Cl.
CPC ............ *H02M 1/4233* (2013.01); *Y02B 70/126* (2013.01); *Y02B 70/1441* (2013.01); *H02M 2001/0074* (2013.01); *Y02B 70/1475* (2013.01); *H02M 2001/007* (2013.01); *Y02B 70/1433* (2013.01); *H02M 7/219* (2013.01); *H02M 3/33592* (2013.01)
USPC ............................................. 363/79; 363/89

(58) Field of Classification Search
USPC ........... 363/17, 21.02, 21.03, 65, 84, 89, 125, 363/127, 79; 323/266
See application file for complete search history.

(56) References Cited

U.S. PATENT DOCUMENTS

| 5,233,509 | A | 8/1993 | Ghotbi |
| 5,646,835 | A | 7/1997 | Katcha |
| 6,031,748 | A * | 2/2000 | Hong ............................. 363/89 |
| 6,218,792 | B1 | 4/2001 | Berth et al. |

(Continued)

FOREIGN PATENT DOCUMENTS

| DE | 19 750 041 C1 | 1/1999 |
| DE | 198 27 872 A1 | 12/1999 |
| EP | 2 180 586 A1 | 4/2010 |

OTHER PUBLICATIONS

Search Report issued on May 29, 2012, by the European Patent Office for Application 11180537.0.

(Continued)

*Primary Examiner* — Gary L Laxton
(74) *Attorney, Agent, or Firm* — Buchanan, Ingersoll & Rooney PC

(57) ABSTRACT

A converter includes an active stage for converting an AC input voltage at an AC input into an intermediate DC voltage, and a DC/DC converter for transforming the intermediate DC voltage into an output DC voltage at a DC output. The DC/DC converter has a resonant transformer formed by a resonant circuit and a transformer. The converter also includes control unit configured to actively operate the active stage only based on an output DC voltage of the DC/DC converter, an input voltage, and an input current of the converter, and to operate the DC/DC converter in an open loop mode. A method for operating such a converter is also provided.

20 Claims, 3 Drawing Sheets

(56) References Cited

U.S. PATENT DOCUMENTS

| | | | | |
|---|---|---|---|---|
| 6,307,761 | B1* | 10/2001 | Nakagawa | 363/65 |
| 6,344,979 | B1 | 2/2002 | Huang et al. | |
| 6,882,551 | B2* | 4/2005 | Shimada et al. | 363/79 |
| 7,375,994 | B2* | 5/2008 | Andreycak | 363/89 |
| 7,447,050 | B2* | 11/2008 | Stefanutti et al. | 363/65 |
| 8,330,434 | B2* | 12/2012 | Melanson | 323/207 |
| 2006/0221653 | A1 | 10/2006 | Lai et al. | |
| 2011/0222317 | A1 | 9/2011 | Coccia et al. | |

OTHER PUBLICATIONS

Zhao et al., "Voltage and Power Balance Control for a Cascaded Multilevel Solid State Transformer", IEEE Applied Power Electronics Conference and Exposition, 2010, pp. 761-767.

* cited by examiner

MULTILEVEL CONVERTER AND A CONTROL METHOD FOR OPERATING A MULTILEVEL CONVERTER

RELATED APPLICATION

This application claims priority under 35 U.S.C. §119 to European Patent Application No. 11180537.0 filed in Europe on Sep. 8, 2011, the entire content of which is hereby incorporated by reference in its entirety.

FIELD

The present disclosure relates to multilevel converters, such as modular multilevel converters that are galvanically isolated. Furthermore, the present disclosure relates to a control method for operating a multilevel converter for providing a constant average output DC (direct current) link voltage.

BACKGROUND INFORMATION

Multilevel converters are known in the art. For transportation purposes, for instance, there is a need for transformation of a medium input AC (alternating current) voltage to a medium or low output DC voltage. In general, an AC/DC converter can be implemented in a two-stage approach, including an active front end stage and a DC/DC converter stage.

A control unit is provided to control the active front end stage and the DC/DC converter stage in such a way to provide a constant average output DC link voltage. A number of sensing elements are used for measuring the line input voltage, line input current, DC link output voltage, resonant current on the primary/secondary side of the DC/DC converter, and the DC link voltages of all levels on the active front end units.

This kind of multilevel converter has a multilevel topology, where the active front end stages are serially connected, while the isolated DC/DC converter stages are paralleled at the output. In case of a multilevel converter topology, the sensing elements have to measure the current on the secondary sides of each DC/DC converter and the DC link output voltages of each active front end stage.

The control unit serves for controlling the active front end stage and the DC/DC converter stage such that the key control targets of an average constant output DC link voltage and of controlling the power factor (e.g. near unity) and the total harmonic distortion (THD) of the line current as low as possible are met. Since the multilevel converter in medium voltage applications is operated directly from a medium voltage source, the isolation requirements for the sensing equipment are quite demanding. Hence, there can be a reduction in the number of voltage/current sensors for measurement needed to apply the control scheme in the control unit.

EP 2 180 586 A1 and U.S. Pat. No. 6,344,979 B1 disclose an AC/DC converter which has the above-described two-stage topology and uses an LLC resonant circuit or a CLL resonant circuit, respectively, to make the DC/DC converter a resonant converter.

DE 198 27 872 A1 discloses a multilevel power electronics transformer having a two-stage topology with an active front end unit and a non-resonant DC/DC converter.

DE 19 750 041 C1 discloses a DC/DC converter having an active front end and a DC/DC converting stage being a resonant stage.

Furthermore, U.S. Pat. No. 6,218,792 B1 discloses a modular converter arrangement with a focus on modules, mechanical features and connectivity.

U.S. Pat. No. 5,646,835 discloses a series resonant circuit which includes an inverter having Insulated Gate-Bipolar Transistors (IGBTs). The series resonant circuit includes a controller which utilizes phase and frequency modulation in conjunction with a logarithmic amplifier to control the inverter.

U.S. 2006/0221653 A1 discloses a multilevel converter-based intelligent universal transformer including back-to-back interconnected multilevel converters coupled to a switched inverter circuit via a high-frequency transformer. The input of the universal transformer can be coupled to a high voltage distribution system, and the output of the universal transformer can be coupled to a low voltage application.

In document T. Zhao, G. Wang, J. Zeng, S. Dutta, S. Bhattacharya and A. Q. Huang, "Voltage and Power Balance Control For a Cascaded Multilevel Solid-State Transformer", IEEE Applied Power Electronics Conference and Exposition, APEC 2010, pp. 761-767, a dual active bridge converter is used for a DC/DC converter stage. Power flow in the dual active bridge converter is controlled by controlling the phase shift between the voltages applied on the input and the output side across a transformer leakage inductance. To achieve power balancing among the stages, all voltages and currents on each level on both sides need to be measured.

A converter of the generic type is also disclosed in U.S. Pat. No. 5,233,509.

SUMMARY

An exemplary embodiment of the present disclosure provides a converter which includes an active stage for converting an AC input voltage at an AC input into an intermediate DC voltage, and a DC/DC converter for transforming the intermediate DC voltage into an output DC voltage at a DC output. The DC/DC converter includes a resonant transformer formed by a resonant circuit and a transformer. The exemplary converter also includes a control unit configured to actively operate the active stage only based on an output DC voltage of the DC/DC converter, an input voltage of the converter, and an input current of the active stage. In addition, the control unit is configured to operate the DC/DC converter in an open loop mode.

An exemplary embodiment of the present disclosure provides a method for operating a converter. The converter includes an active stage for converting an AC input voltage at an AC input into an intermediate DC voltage, and a DC/DC converter for transforming an intermediate DC voltage into an output DC voltage at an DC output. The DC/DC converter has a resonant transformer formed by a resonant circuit and a transformer. The exemplary method includes actively operating the active stage only based on an output DC voltage of the DC/DC converter, an input voltage of the converter, and an input current of the active stage. In addition, the exemplary method includes operating the DC/DC converter in an open loop mode.

BRIEF DESCRIPTION OF THE DRAWINGS

Additional refinements, advantages and features of the present disclosure are described in more detail below with reference to preferred embodiments illustrated in the drawings, in which.

DETAILED DESCRIPTION

Figure 1:
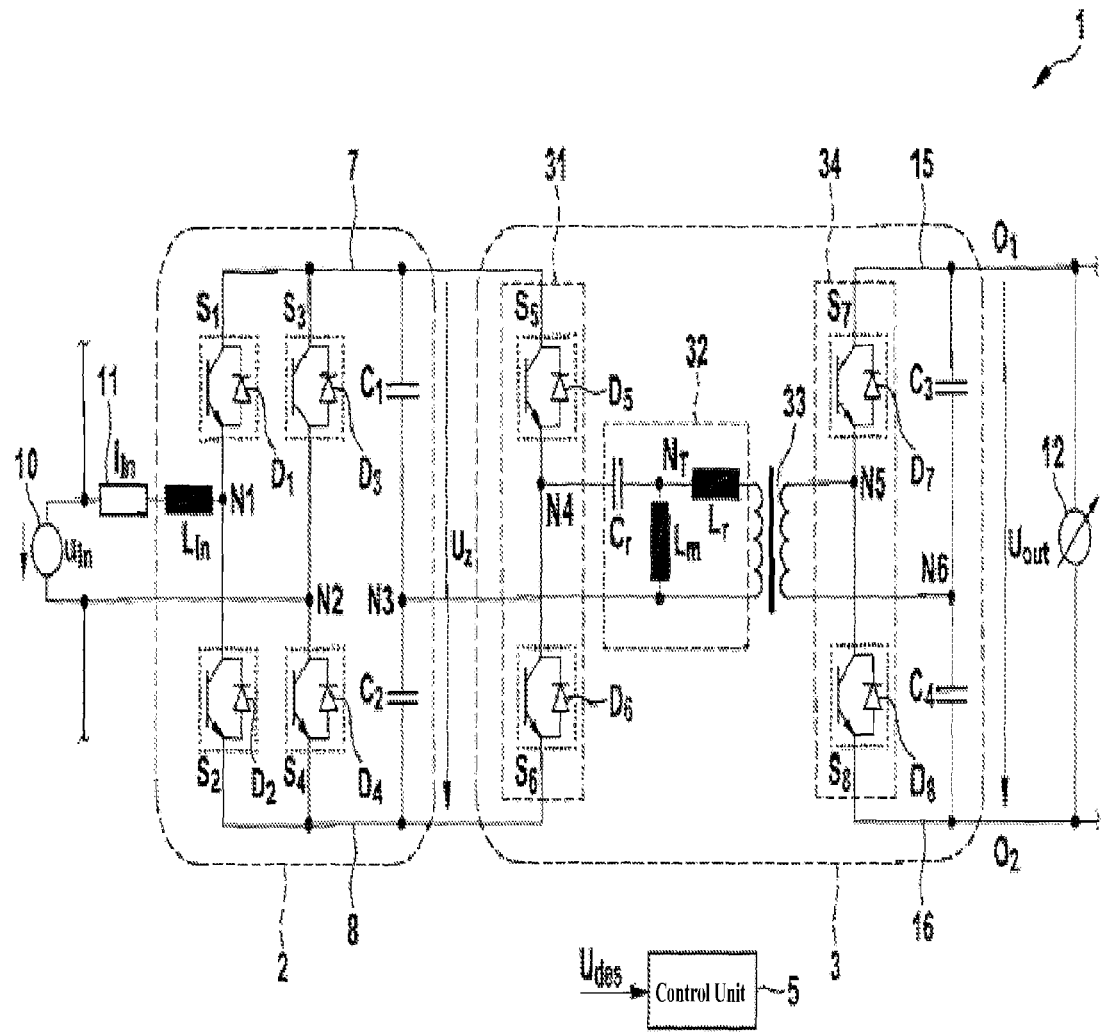
FIG. 1 shows a schematic of an AC/DC converter having an active front end stage and a DC/DC converter stage according to an exemplary embodiment of the present disclosure.

Exemplary embodiments of the present disclosure provide a control method for a multilevel converter which allows the number of sensed voltages and currents to be reduced.

This feature is achieved by a control method for a multilevel converter, and a multilevel converter which are described in further detail below.

In accordance with an exemplary embodiment of the present disclosure, a multilevel converter includes an active stage for converting an AC input voltage at an AC input into an intermediate DC voltage, and a DC/DC converter for transforming the intermediate DC voltage into an output DC voltage at an DC output. The DC/DC converter has a resonant transformer, for example a resonant transformer which is formed by a resonant circuit and a transformer. The multilevel converter also includes a control unit configured to actively operate the active stage only based on an output DC voltage of the DC/DC converter, an input voltage, and an input current of the active stage. In addition, the control unit is configured to operate the DC/DC converter in an open loop mode.

In accordance with an exemplary embodiment of the present disclosure, a converter and a control scheme for such a converter are provided, wherein it is sufficient to sense only the output DC voltage of the DC/DC converter, the input voltage and the input current of the active stage to achieve the control targets of a constant average of the output DC link voltage and a sinusoidal input current for a controllable power factor.

As for the DC/DC converter, a resonant converter with a transformer is used. The DC/DC converter is operated in an open loop mode so that the voltages on a primary and secondary side of the transformer correlate to each other substantially independent of the supplied output current.

Therefore, in accordance with an exemplary embodiment, the control method only utilizes the input voltage and input current and the output voltage as the controlled quantity since, due to the resonant DC/DC converter, a voltage on the primary side of the resonant converter is imposed to a fixed value as well. Therefore, there is no need for additional control of the voltage of primary side voltages and the control of the output DC voltage only is sufficient due to the tight coupling between primary and secondary side of the DC/DC resonant converter.

Furthermore, the control unit may be configured to operate the DC/DC converter in the open loop mode by switching the active switch with a switching frequency which corresponds to a resonance frequency of the resonant transformer or below. Hence, it can be achieved that in the DC/DC resonant converter which operates in an open loop mode, a fixed operating point can be defined which can be optimized regarding efficiency.

According to an exemplary embodiment, the DC/DC converter may have a first switching unit and a second switching unit each having switching elements that are each respectively paralleled by freewheeling diodes. The resonant transformer is arranged between the first switching unit and the second switching unit the resonant transformer. The control unit is configured to operate one of the switching units with a duty cycle of about 50% and at the switching frequency. For instance, according to an exemplary embodiment, the control unit is either configured not to drive the respective other of the switching units so that freewheeling diodes act as a passive rectifier, or is configured to operate the respective other one of the switching units to act as an active rectifier.

It turned out that an operation at a fixed duty cycle of about 50% in a region at or below the resonance frequency is sufficient. This provides the zero voltage switching for the pulsed semiconductors during turn-on and a quasi-zero current switching during turn-off as the value of the turn-off current can be controlled and minimized during design of the resonant tank.

Depending on the power flow, the DC/DC converter may be operated to actively switch either a primary or a secondary switching unit, while the respective other switching unit may, depending on the topology, either be operated as a passive rectifier or be operated by switching to act as an active rectifier. In case one of the switching units is operated as a passive rectifier, it acts as an impedance transformer, wherein the equivalent load resistance is different from the actual load resistance and can be easily derived. For a constant output DC link voltage, a voltage on the primary side of the resonant converter is also clamped to the fixed value which is determined by the transformer turn ratios and influenced by the voltage across the trans-impedance of the resonant circuit.

In accordance with an exemplary embodiment, the control unit may have a control function which feedback controls the DC output voltage and the input current by taking into account the output DC voltage, and the input voltage and the input current of the active stage.

Furthermore, the control function may be a cascaded control function.

The active stage may have an H-bridge circuit, wherein the H-bridge circuit is operated according to a modulation index which is a result of the control function.

In accordance with an exemplary embodiment, the active stage may have a serially applied input inductor.

According to an exemplary embodiment, the resonant transformer may be formed by a resonant circuit and a transformer, wherein the resonant circuit includes a resonant inductor a resonant capacitor and a parallel inductor.

According to an exemplary embodiment of the present disclosure, an arrangement including a plurality of above converters may be provided, wherein the AC inputs of the active stages are serially connected, and the DC outputs of the DC/DC converter are connected in parallel. The control unit is configured to actively operate the active stages only based on the common output DC voltage of the paralleled DC/DC converters, the input voltage at an input of the arrangement, and the input current through the arrangement.

Moreover, a common input inductor may be provided in series with the serially connected active stages.

It is noted that the above input voltage corresponds to an input line voltage externally applied to the converter and the coupled converters. In accordance with an exemplary embodiment, input inductors may be provided to decouple the input line voltage externally supplied from the voltage over the switches (H-bridge circuit) within the active stage.

An exemplary embodiment of the present disclosure provides a method for operating a converter. The exemplary method includes actively operating the active stage only based on an output DC voltage of the DC/DC converter, an input voltage and an input current of the active stage. The exemplary method also includes operating the DC/DC converter in an open loop mode.

FIG. 1 shows an AC/DC converter 1 for use in a medium voltage power electronics transformer according to an exemplary embodiment of the present disclosure. Such kind of converters can, for example, be used for traction purposes.

The AC/DC converter 1 has an active front end stage 2 (active stage) and a DC/DC converter stage 3. Although such a converter 1 can be operated bidirectionally, the following description refers to an energy flow from the active front end stage 2 to the DC/DC converter stages 3 as commonly used for traction applications.

The active front end stage 2 has AC terminals to receive an AC input voltage $u_{in}$. DC terminals of the active front end stage 2 are provided to supply a converted intermediate DC link voltage $U_z$. The intermediate DC link voltage $U_z$ is connected to first terminals of the DC/DC converter stage 3 which serves for decoupling and transforming the intermediate DC link voltage $U_z$ to an output voltage $U_{out}$.

The active front end stage 2 is an actively controlled AC/DC converting unit. In the present embodiment, the active front end stage 2 includes a first to fourth switching element $S_1$ to $S_4$ interconnected as an H-bridge circuit. The switching elements $S_1$ to $S_4$ can be provided as power MOSFETs, IGBTs, IGCTs and the like, each having a free-wheeling diode $D_1$ to $D_4$, respectively, in parallel. In accordance with an exemplary embodiment, the first and the second switching elements $S_1$ and $S_2$ are connected in series between a first DC line 7 and a second DC line 8 supplying the intermediate DC link voltage $U_z$. In the same manner, a third switching element $S_3$ and a fourth switching element $S_4$ are connected in series between the first DC line 7 and the second DC line 8.

The AC input line voltage $u_{in}$ is connected to a first node N1 that is between the serially connected first and second switching elements $S_1$, $S_2$ via an input inductor $L_{in}$ of the active front end stage 2 and to a second node N2 that is between the serially connected third and fourth switching elements $S_3$, $S_4$. Between the first DC line 7 and the second DC line 8, a serial connection of DC link capacitors C1 and C2 is further connected.

The passive DC/DC converter stage 3 is coupled with the DC lines 7, 8 of the active front end stage 2 to receive the intermediate DC link voltage $U_z$. The passive DC/DC converter stage 3 has a first half bridge circuit 31 which is a serial connection of a fifth switching element $S_5$ and a sixth switching element $S_6$ which are coupled with the DC terminals, for example, the first DC line 7 and the second DC line 8 of the active front end stage 2.

A resonant tank 32 is provided. One input of the resonant tank 32 is coupled with a fourth node N4 of the first half bridge 31 between the fifth and the sixth switching elements $S_5$, $S_6$, and a second input of the resonant tank 32 is coupled with a third node N3 of the serial connection of the first and second capacitors $C_1$, $C_2$ of the active front end stage 2. Further terminals of the resonant tank 32 are coupled with a primary side of a transformer 33. It may also be possible that instead with the third node N3, the resonant capacitor is connected to the second DC line 8.

As shown in FIG. 1, the resonant tank 32 may include a resonant capacitor Cr which is connected between the fourth node N4 of the first half bridge 31 and a T-node NT of the resonant tank 32. The T-node NT is connected via a resonant inductor $L_r$ of the resonant tank 32 with a first terminal of the primary side of the transformer 33. The third node N3 of the serial connection of the capacitors $C_1$, $C_2$ of the active front end stage 2 is connected with a second terminal of the primary side of the transformer 33. A parallel inductor $L_m$ of the resonant tank 32 is provided between the T-node NT and the second terminal of the primary side of the transformer 33.

Alternatively, the resonant tank 32 may include a series connection of a resonant capacitor $C_r$ and a resonant inductor which is connected between the fourth node N4 of the first half bridge 31 and a first terminal of the primary side of the transformer 33. The third node N3 of the serial connection of the capacitors $C_1$, $C_2$ of the active front end stage 2 is connected with a second terminal of the primary side of the transformer 33. A parallel inductor $L_m$ of the resonant tank 32 is provided between the first terminal of the primary side of the transformer 33 and the second terminal of the primary side of the transformer 33.

According to an exemplary embodiment, the resonant tank 32 may include a resonant inductor $L_r$, which is connected between the fourth node N4 of the first half bridge 31 and a first terminal of the primary side of the transformer 33, and a resonant capacitor $C_r$, which is connected between the third node of the serial connection of the capacitors $C_1$, $C_2$ of the active front end stage 2 and a second terminal of the primary side of the transformer 33. A parallel inductor $L_m$ is provided between the first and second terminals of the primary side of the transformer 33.

In accordance with an exemplary embodiment, the resonant inductor $L_r$ and the parallel inductor $L_m$ of the resonant tank 32 may also be integrated into the magnetic structure of a transformer 33.

It may also be possible that instead with the third node N3, the resonant capacitor $C_r$ is directly connected to the second DC line 8. In cases where the second input of the resonant tank 32 is coupled with the second DC line 8, the second terminal of the primary side of the transformer 33 may be directly connected with the second DC line 8, for example, without any components between the second DC line 8 and the second terminal of the primary side of the transformer 33.

A first terminal of a secondary side of the transformer 33 is coupled with a fifth node N5 of a second half bridge 34 including a serial connection of a seventh and eighth switching elements $S_7$, $S_8$. The serial connection of the second half bridge 34 is connected between first and second DC output lines 15, 16 connected with a first and second output terminal $O_1$, $O_2$, respectively.

The switching elements $S_1$ to $S_4$ of the active front end stage 2 and the switching elements $S_5$ to $S_8$ of the first and second half bridges 31, 34 can be implemented as MOSFETs, IGBTs, IGCTs and the like each having an integrated (intrinsic) or separate freewheeling diode $D_1$ to $D_8$, respectively, which is connected in parallel to and in a reverse-biased manner with the respective switching element $S_1$ to $S_8$.

Between the first and second output terminals $O_1$, $O_2$, a serial connection of a third and a fourth capacitor $C_3$, $C_4$ is applied, wherein a sixth node N6 of a serial connection of a third and fourth capacitor $C_3$, $C_4$ is coupled with a second terminal of the secondary side of the transformer 33. Alternatively, the second terminal of the secondary side of the transformer 33 can also be directly coupled with the second output terminal $O_2$.

In accordance with an exemplary embodiment, the resonant capacitor $C_r$ may be split into one capacitor connected with the first/second terminal of the primary side of the transformer 33 and another capacitor connected with the first/second terminal of the secondary side of the transformer 33.

The AC/DC converter 1 is controlled by a control unit 5. To provide the control unit 5 with the input measures, a voltage-sensing unit 10 is provided to detect the AC input voltage $u_{in}$ and a current-sensing unit 11 is provided to detect the AC input current $i_{in}$. Furthermore, an output-sensing unit 12 is provided to detect the output voltage $U_{out}$.

The control unit 5 controls the operation of the active front end stage 2 and controls the passive DC/DC converter stage 3. The control is carried out based on the input measures of the AC input voltage $u_{in}$, the AC input current $i_{in}$ and the DC output voltage $U_{out}$ as well as a given desired output voltage $U_{des}$.

The DC/DC converter stage 3 is implemented as a resonant transformer stage, wherein the resonant tank 32 provides a resonance frequency of the combined circuit of the resonant tank 32 and the transformer 33, wherein one resonance frequency can be adapted by careful selection of the resonant inductor $L_r$ and the resonant capacitor $C_r$. Another resonance frequency is defined by selecting the values of defined by resonant inductor $L_r$ and the resonant capacitor $C_r$ and the parallel inductor $L_m$. Depending on the energy flow, either the first half bridge 31 or the second half bridge 34 is switched while the respective other half bridge is passive, so that the associated freewheeling diodes simply act as a rectifier.

In the present case, it is assumed that the energy flow is from the active front end stage 2 to the DC/DC converter stage 3 to the output terminals $O_1$, $O_2$. In this case only the first half bridge 31 is actively switched while the switching elements $S_7$ and $S_8$ of the second half bridge 34 are switched off, so that the associated freewheeling diodes $D_7$ and $D_8$ are rectifying voltage and current provided by the secondary side of the transformer 33.

In accordance with an exemplary embodiment, the DC/DC converter can be realized with multilevel topology on both side of resonant tank 32. Then, switching would be required on both sides irrespectively from the power flow such that an active rectification is obtained.

Assuming that the converter 1 is operated as an AC/DC converter, main control targets are that the output DC link voltage $U_{out}$ is constant in average and that the input current $i_{in}$ has a low THD and that near unity power factor is controlled. Due to the use of the resonant transformer stage 3, the constant output DC link voltage $U_{out}$ across the serial connection of the capacitors $C_3$ and $C_4$ and the intermediate voltage $U_z$ on the input side of the transformer stage 3 across the capacitors $C_1$ and $C_2$ are clamped to the fixed value as well and are determined by the transformer turn ratio and by the voltage across the trans-impedance of the resonant tank 32.

The transformer stage 3 can be operated in an open loop at a fixed operating point which can be optimized for the best possible efficiency. A fixed frequency of approximately 50% duty cycle of the actively operated half bridge in the region at or below the resonance frequency is sufficient. This provides a zero voltage switching for the active half bridge during turn-on and a quasi-zero current switching during turn-off.

To achieve the above main control targets, it is sufficient to acquire as an input measure the input voltage $u_{in}$, the input current $i_{in}$ and the output voltage $U_{out}$, the latter one being strongly correlated with the intermediate voltage $U_z$.

Figure 2:
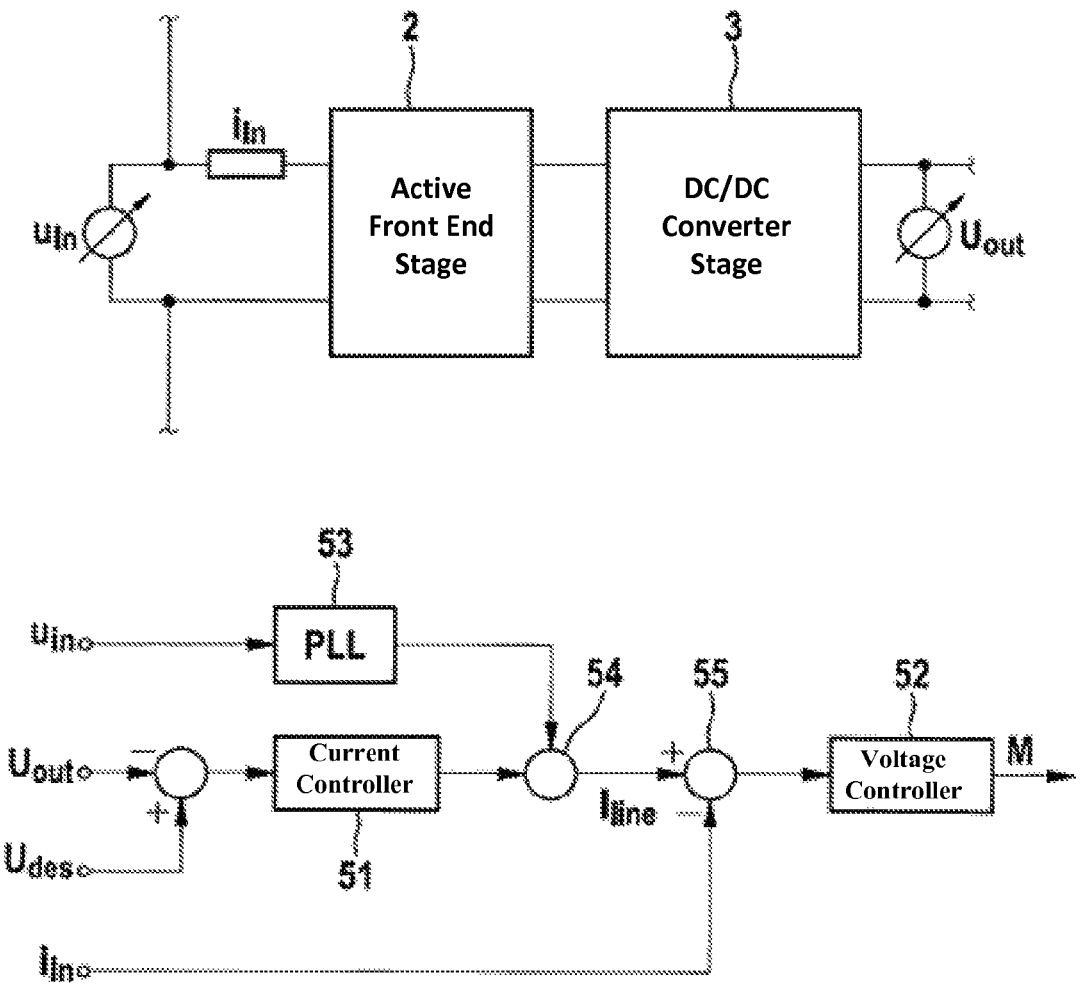
FIG. 2 shows a block diagram illustrating a control scheme for operating the multilevel converter according to an exemplary embodiment of the present disclosure.

As shown in FIG. 2, the control scheme may, for example, be implemented as a cascaded control loop with an inner line current controller 51 and an outer output DC link voltage controller 52. The line input current controller 51 performs a control, for example, using a P or I control block, depending on an output voltage difference between a desired voltage $U_{des}$, and the actual output voltage $U_{out}$. The output value of the inner line current controller 51 is multiplied in a multiplication block 54 with a sinusoidal waveform signal extracted from the AC input voltage $u_{in}$ using a phase-locked loop circuit 53 so that a sinusoidal AC current signal is obtained having an amplitude depending on the difference between the desired voltage $U_{des}$ and the actual output voltage $U_{out}$. A control current $i_{line}$ is obtained.

The control current $i_{line}$ and the input current $i_{in}$ are subtracted from each other in a subtraction block 55, and the resulting current difference is supplied to the outer output DC link voltage controller 52 to obtain a modulation index M, which is used for operating the active front end stage 2. In general, the modulation index indicates a modulation scheme and describes by how much a modulated variable of a carrier signal varies around its unmodulated level. Therefore, the intermediate link voltage $U_z$ generated depending on the modulation index M can be controlled just by using electrical measures available at the input and output side of the converter 1.

Figure 3:
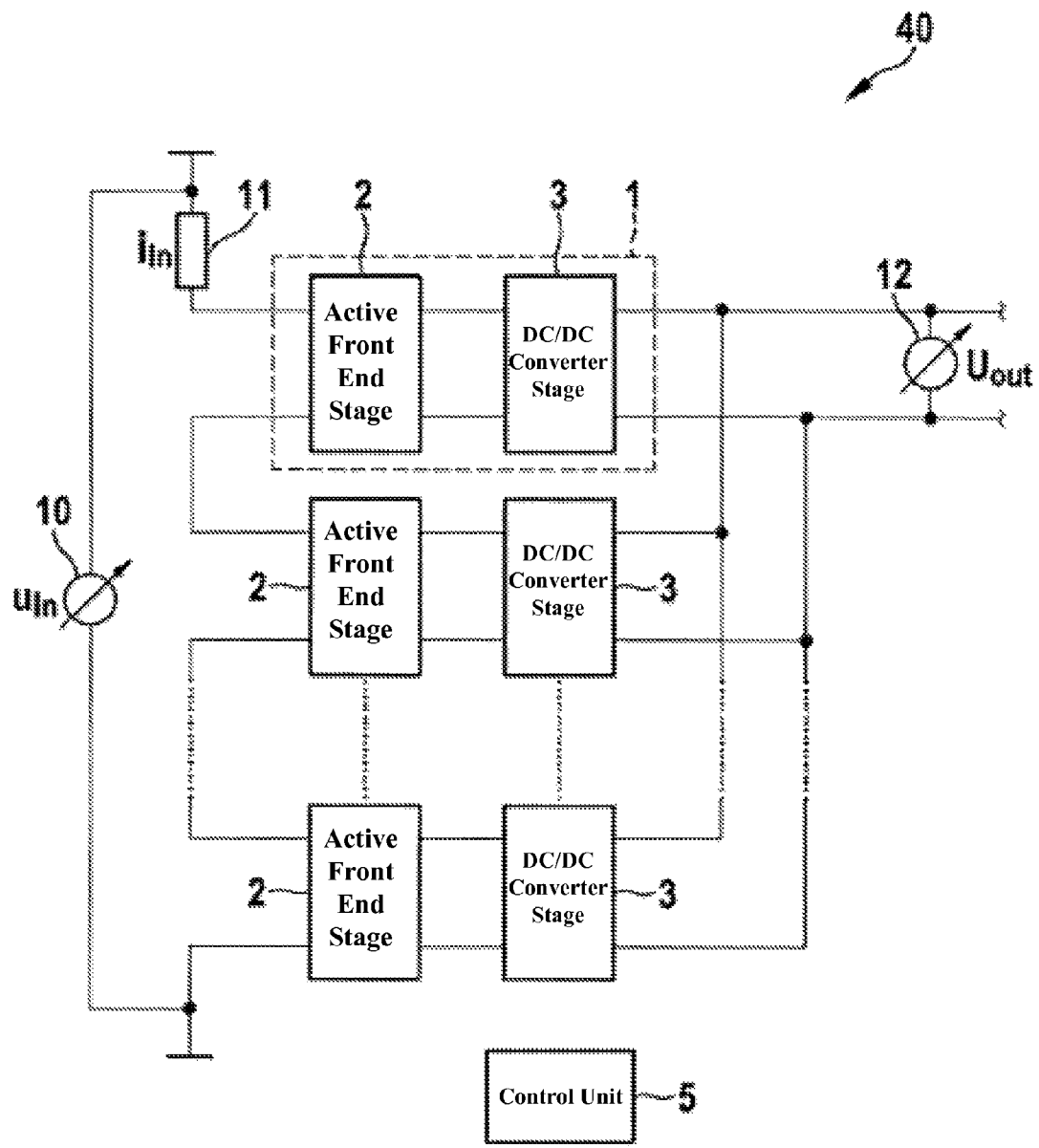
FIG. 3 shows a multilevel converter having a plurality of AC/DC converters according to an exemplary embodiment of the present disclosure.

FIG. 3 shows a converter arrangement 40 having a plurality of converters 1 which are serially connected at the input sides and wherein the output terminals are connected in parallel, according to an exemplary embodiment of the present disclosure. In other words, the first output terminals $O_1$ of each converter 1 are interconnected, and the second output terminals $O_2$ are interconnected. On the input side, the active front end stages 2 are serially connected such as a daisy chain and the input voltage is applied over the serially connected active front end stages 2.

The converter arrangement 40 is controlled by the control unit 5. The measures supplied to the control unit 5 are obtained by the voltage-sensing unit 10 to detect the AC input voltage $u_{in}$ over all the serially connected active front end stages 2, and the current-sensing unit 11 to detect the AC input current $i_{in}$ through all active frontend stages 2. Furthermore, an output-sensing unit 12 is provided to detect the common output voltage $U_{out}$ of all DC/DC converter stages 3.

In accordance with another exemplary embodiment, the input inductors $L_{in}$ of all or a part of the active front end stages 2 can be replaced with a common input inductor serially connected with the active front end stages 2 to decouple the AC input voltage $u_{in}$ from the voltage over the serially connected active front end stages 2.

The control method of the present disclosure is also applicable for the converter arrangement of FIG. 3. As all outputs of the DC/DC converter stages 3 are connected in parallel, it implies that all the floating DC links on the primary side of the transformer stages 3 (or at the output of the active front end stages 2) will be clamped to an ideally identical value. Therefore, there is no need for additional control of the intermediate DC link voltage $U_z$, and control of the output DC link voltage only is sufficient due to the tight coupling between the primary and secondary side in the DC/DC converter stage 3 as it is formed as a resonant converter.

An influence of parameter variations among different converters with regard to a balanced power sharing and capacitor balancing on the primary side is low as the topology of FIG. 3 is rather robust and not sensitive to variations of these parameters. For example, sensitivity to variations of the value of the resonant inductor $L_r$, the resonant capacitor $C_r$ and DC link capacitance is low and even a variation of plus or minus 20% can be tolerated.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the disclosure is indicated by the appended claims rather than the foregoing description and all changes that come within the meaning and range and equivalence thereof are intended to be embraced therein.

REFERENCE LIST 1 converter
2 active front end stage
3 DC/DC converter stage
5 control unit
7 first DC line
8 second DC line
10 input voltage sensing unit
11 input current sensing unit
12 output voltage sensing unit
31 first half bridge
32 resonant tank
33 transformer
34 second half bridge
$S_1$ to $S_8$ switching elements
$D_1$ to $D_8$ freewheeling diodes
$C_r$ resonant capacitor
$L_r$ resonant inductor
$L_m$ parallel inductor
$L_{in}$ input inductor
51 inner line current controller
52 outer output DC link voltage controller
53 phase-locked loop
54 multiplication block
55 substraction block

What is claimed is:

1. A converter comprising:
an active stage for converting an AC input voltage at an AC input into an intermediate DC voltage;
a DC/DC converter for transforming the intermediate DC voltage into an output DC voltage at a DC output, wherein the DC/DC converter includes a resonant transformer formed by a resonant circuit and a transformer; and
a control unit configured to
actively operate the active stage only based on an output DC voltage of the DC/DC converter, an input voltage of the DC/DC converter, and an input current of the active stage, and
operate the DC/DC converter in an open loop mode.

2. The converter according to claim 1, wherein the control unit is configured to operate the DC/DC converter in the open loop mode by switching the active stage with a switching frequency which corresponds to a resonance frequency of the resonant transformer or below.

3. The converter according to claim 1, wherein the DC/DC converter includes a first switching unit and a second switching unit each having switching elements each respectively paralleled by freewheeling diodes,
wherein the resonant transformer is arranged between the first switching unit and the second switching unit, and
wherein the control unit is configured to operate one of the switching units with a duty cycle of about 50% and at the switching frequency.

4. The converter according to claim 3, wherein the control unit is configured to one of (i) not drive the respective other of the switching units so that freewheeling diodes act as a passive rectifier, and (ii) operate the respective other one of the switching units to act as an active rectifier.

5. The converter according to claim 1, wherein the control unit has a control function which feedback controls the DC output voltage and the input current by taking into account the DC output voltage, the input voltage of the active stage, and the input current of the active stage.

6. The converter according to claim 5, wherein the control function is a cascaded control function.

7. The converter according to claim 5, wherein the active stage has an H-bridge circuit, and
wherein the H-bridge circuit is operated according to a modulation index which is a result of the control function.

8. The converter according to claim 1, wherein the active stage has a serially applied input inductor.

9. The converter according to claim 1, wherein the resonant transformer is formed by a resonant circuit and a transformer, and
wherein the resonant circuit includes a resonant inductor, a resonant capacitor and a parallel inductor.

10. An arrangement comprising a plurality of converters according to claim 1,
wherein respective AC inputs of respective active stages of the plurality of converters are serially connected, and respective DC outputs of the DC/DC converter of the plurality of converters are connected in parallel,
wherein the control unit is configured to actively operate the active stages only based on a common output DC voltage of the paralleled DC/DC converters, the input voltage at an input of the arrangement and the input current through the arrangement.

11. The arrangement according to claim 10, comprising:
a common input inductor in series with the serially connected active stages.

12. A method for operating a converter, wherein the converter includes:
an active stage for converting an AC input voltage at an AC input into an intermediate DC voltage;
a DC/DC converter for transforming an intermediate DC voltage into an output DC voltage at an DC output, the DC/DC converter having a resonant transformer formed by a resonant circuit and a transformer, and
wherein the method comprises:
actively operating the active stage only based on an output DC voltage of the DC/DC converter, an input voltage of the DC/DC converter, and an input current of the active stage; and
operating the DC/DC converter in an open loop mode.

13. The converter according to claim 2, wherein the DC/DC converter includes a first switching unit and a second switching unit each having switching elements each respectively paralleled by freewheeling diodes,
wherein the resonant transformer is arranged between the first switching unit and the second switching unit, and
wherein the control unit is configured to operate one of the switching units with a duty cycle of about 50% and at the switching frequency.

14. The converter according to claim 13, wherein the control unit is configured to one of (i) not drive the respective other of the switching units so that freewheeling diodes act as a passive rectifier, and (ii) operate the respective other one of the switching units to act as an active rectifier.

15. The converter according to claim 14, wherein the control unit has a control function which feedback controls the DC output voltage and the input current by taking into account the DC output voltage, the input voltage of the active stage, and the input current of the active stage.

16. The converter according to claim 15, wherein the control function is a cascaded control function.

17. The converter according to claim 16, wherein the active stage has an H-bridge circuit, and
wherein the H-bridge circuit is operated according to a modulation index which is a result of the control function.

18. The converter according to claim 13, wherein the active stage has a serially applied input inductor.

19. An arrangement comprising a plurality of converters according to claim 13,
wherein respective AC inputs of respective active stages of the plurality of converters are serially connected, and respective DC outputs of the DC/DC converter of the plurality of converters are connected in parallel,
wherein the control unit is configured to actively operate the active stages only based on a common output DC voltage of the paralleled DC/DC converters, the input voltage at an input of the arrangement and the input current through the arrangement.

20. The arrangement according to claim 19, comprising:
a common input inductor in series with the serially connected active stages.

* * * * *